United States Patent [19]

Trell

[11] Patent Number: 5,046,083
[45] Date of Patent: Sep. 3, 1991

[54] ENTRANCE COMMUNICATION SYSTEM

[76] Inventor: Anders E. Trell, Högalidsgatan 27, Stockholm, Sweden, S-117 30

[21] Appl. No.: 425,859

[22] Filed: Oct. 24, 1989

[51] Int. Cl.[5] .......................................... H04M 11/00
[52] U.S. Cl. ...................................... 379/93; 379/103
[58] Field of Search .............................. 379/103, 355

[56] References Cited

U.S. PATENT DOCUMENTS

| | | | |
|---|---|---|---|
| 3,917,911 | 11/1975 | Lesher | 379/103 |
| 4,113,986 | 9/1978 | Clement et al. | 379/103 |
| 4,338,493 | 7/1982 | Stenhuis et al. | 379/103 |
| 4,436,958 | 3/1984 | Hansen et al. | 379/103 |
| 4,644,104 | 2/1987 | Middlemiss | 379/103 |
| 4,764,953 | 8/1988 | Chern et al. | 379/103 |

FOREIGN PATENT DOCUMENTS

WO87/00378  1/1587  World Int. Prop. O.

OTHER PUBLICATIONS

Trell, Int'l Patent Classification H04M 11/02 Int'l Publ. No. WO 87/00378, Jan. 15, 87.

Primary Examiner—Jin F. Ng
Assistant Examiner—Stella L. Woo
Attorney, Agent, or Firm—Fleit, Jacobson, Cohn, Price, Holman & Stern

[57] ABSTRACT

An entrance communication system including a programmable number discriminator, arranged to perform an automatic dial-up operation via the public subscriber telephone network to selected subscriber telephone set when addressed from an entrance set, and to establish voice communication therebetween, preferably also accepting control instructions sent as digits from the called party. At least one local communication circuit is included for direct communication between the entrance set and at least one dedicated reply set, which is not connected to the public subscriber telephone network. At least one dedicated reply set is preferably arranged connected to gain access to the line access and dial-up function for establishment of alarm calls or other telephone calls via the public subscriber telephone network. Furthermore, at least one dedicated reply set is preferably arranged connected to gain access to the programming function of the system, and to facilitate reprogramming of the system by pulse code or MFC-signals entered as dialled information from the reply set.

17 Claims, 2 Drawing Sheets

ENTRANCE COMMUNICATION SYSTEM

BACKGROUND OF THE INVENTION

Entrance communication system which include a number discriminator and automatic dial-up of a selected conventional telephone in an apartment from an entrance telephone set via a central switching office in the public subscriber telephone network are previously known, providing voice communication and also facilitating other services, e.g. unlocking of the entrance door. Such an entrance telephone system is disclosed in U.S. Pat. No. 3,947,641 issued March 30, 1976 to A. E. Trell.

U.S. Pat. No. 4,113,986 issued Sep. 12, 1978 to Clement et al, discloses a "hybride solution" involving direct local circuits to the conventional telephone sets of each tenant, and as a result, the entire building must be wired, since nobody can be reached via the public telephone network only. This is obviously a costly solution. This disadvantage also relates to intercom systems based on the use of conventional telephone sets located with each tenant, e.g. as disclosed in U.S. Pat. No. 3,484,561 (Matthews) and U.S. Pat. No. 3,557,318 (Buonsante et al), both requiring costly wiring of the building.

However, with regard to known systems utilizing the public subscriber telephone network for communication, there are no systems that also facilitate use of local direct communication circuits to dedicated reply sets (preferably addressed from a common keypad and preferably having a common discriminator/logic circuits), if desired by a tenant. Prior systems require that each tenant has a telephone connected to the public telephone network, in order to facilitate communication with the entrance. With regard to small firms or offices, having one telephone installation only, it is obviously undesirable to block such a telephone by entrance calls or conventional incoming telephone calls, preventing the other type of calls. Furthermore, if one central unit is arranged to serve a number of independent entrance sets, a continuing call via the public subscriber telephone network established from one entrance set will prevent the establishment of other entrance calls via the public telephone network from other entrance sets (provided that the central unit has only one circuit connected to the public telephone network). A direct line connection will not be blocked. Certain tenants may also be opposed to installing a telephone, connected to the public telephone network.

SUMMARY OF THE INVENTION

It is a primary object of the present invention to provide a solution to the above disadvantages by providing directly addressable local communication circuits in an entrance telephone system of the type which is intended for communication via the public subscriber telephone network, connected to dedicated reply sets in series or in a loop using pulse code techniques for transmission, or (preferably and as described) using individual parallel circuits.

It is a further object to obtain such a feature at a low cost, since the number discriminator, logic circuits and other parts can be shared, due to the fact that normally only a few entrance call intensive circuits will be required for each building, and such tenants will obviously accept the costs involved for the wiring of the local communication circuits and for the purchase of dedicated reply sets, but would on the other hand not be required to accept any call charges. The fact that an incoming call is an entrance call is noted immediately, since ring signals are obtained from the dedicated reply set. All types of signalling influencing the entrance door lock or other control signals can obviously be sent via the local communication circuit from the dedicated reply set in the same fashion as via the public telephone network.

Still a further object is to provide the capability to have the conventional telephone number for a tenant connected to a local communication circuit programmed for access via the public telephone network, whereby a tenant can be reached in "both ways".

A further object is to provide distant reprogramming of the system from a dedicated reply set, a facility which can not be accepted with maximum security from a subscriber telephone set connected to the public subscriber telephone network.

The entrance set can, as before, include all previously known functions, e.g. code lock access and alarm. The local communication circuits may also be of wide band type, in order to facilitate video communication, if desired.

The novel features of the invention are set forth with particularity in the appended claims. The invention will be best understood from the following description when read in conjunction with the accompanying drawing.

DESCRIPTION OF THE PREFERRED EMBODIMENT

Figure 1:
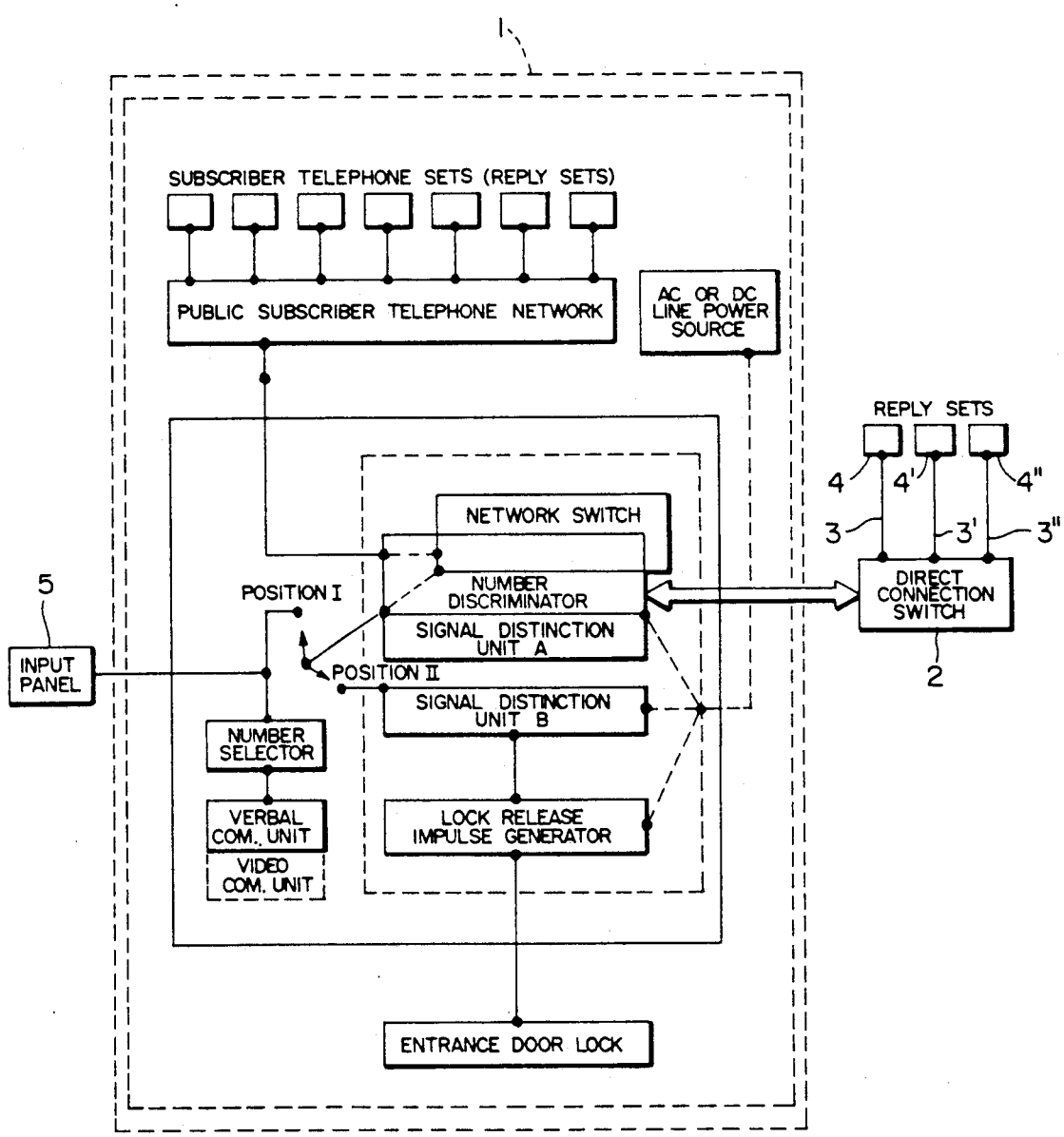
FIG. 1 is a schematic diagram with a known type of an entrance telephone system modified in accordance to a preferred embodiment of the present invention.
Figure 2:
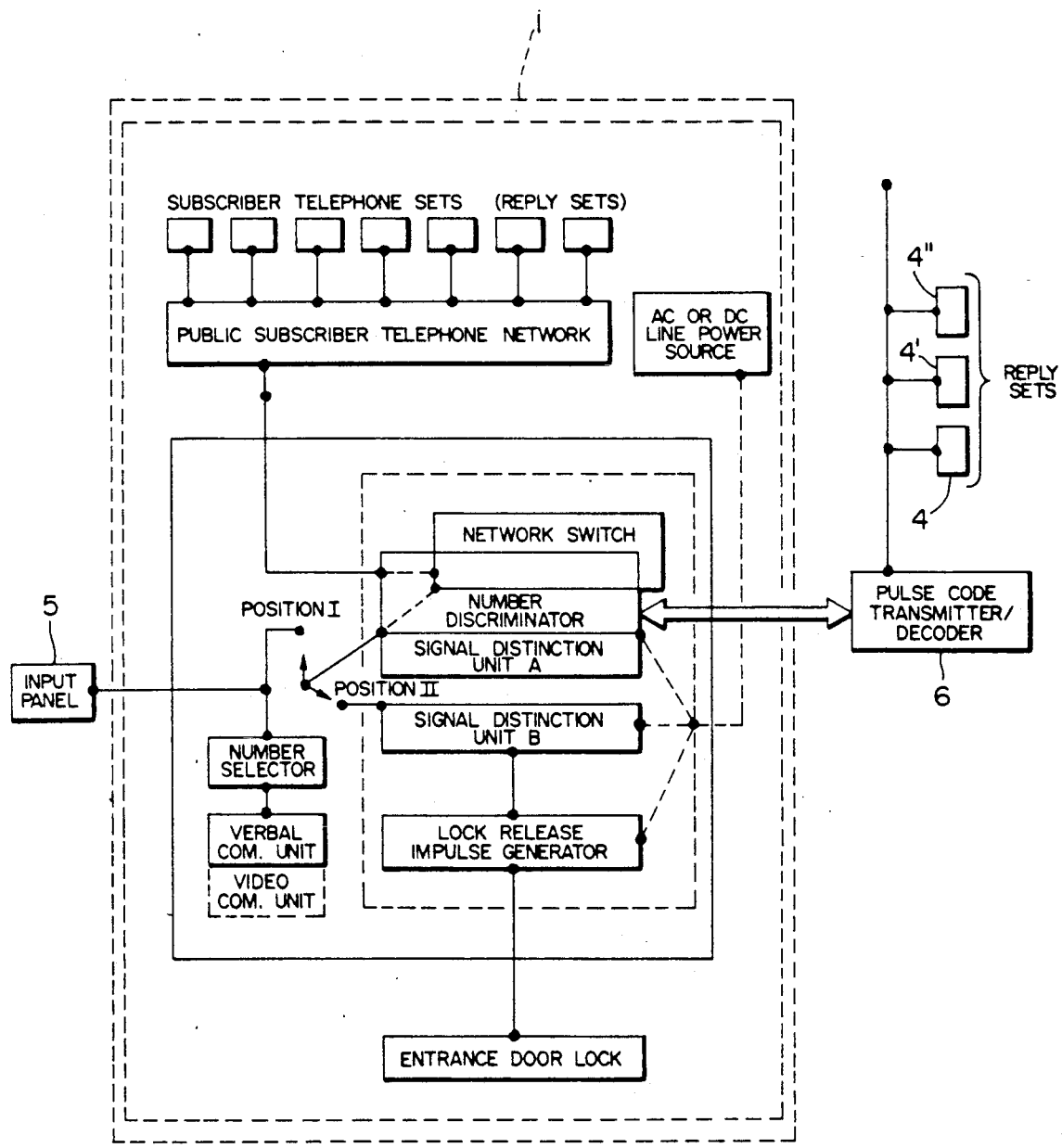
FIG. 2 is a schematic diagram illustrating an alternative method in which dedicated reply sets can be connected.

A preferred embodiment will now be more fully described with reference to the accompanying drawings, in which FIGS. 1 and 2 show an entrance telephone system 1 as disclosed in U.S. Pat. No. 3,947,641 within a frame of broken double lines. Since this system is fully described in the aforementioned patent, only the modification of same according to the present invention is described. However, it should be emphasized, that the known system shown within the frame may also be any other known system using the public subscriber telephone network for communication with the tenants subscriber telephone sets, and that further functions may be included, e.g. alarm transmission facilities.

According to the invention as shown in FIG. 1, the number discriminator is not only connected to the network switch for access to the public subscriber telephone network, but also connected to a direct connection switch 2, from which a number of individual communication circuits 3, 3', 3'' are wired to dedicated reply sets 4, 4', 4''. These dedicated reply sets 4, 4', 4'' can thus be reached directly, without communication via the public subscriber telephone network, and by providing these reply sets 4, 4', 4'' with a keypad or similar, they can perform all types of signalling accepted by the system, e.g. entrance door lock release. The number discriminator is programmed to route all calls identified as direct connection calls to the direct connection switch 2, which selects the choosen reply set 4, 4', 4'' and establishes the connection, whereafter ring signals are generated.

Alternatively, the number discriminator may also be arranged with a number of outputs, each one dedicated as a connection for a direct circuit, whereby the direct connection switch 2 can be omitted.

The local communication circuits 3, 3', 3" can be accessed in a conventional manner from the keypad by the entrance set by programming the number discriminator to establish the call as a direct local call rather than a call via the public subscriber telephone network.

Each entrance set may also be arranged with an optional input panel 5 for establishment of direct connections, with individual keys for every tenant that can be connected via direct and local communication circuit 3, 3', 3". Each key may be located adjacent to a name plate for a tenant, and by depressing such a key, a code sequence can be sent comprising two components, a first component identifying the call as a directly routed call, and a second component identifying the called party. Alternatively, such an optional panel 5 may also be connected to an individual input terminal, distinguising signals from the optional panel 5 from signals sent from the keypad used for addressing tenants via the public subscriber telephone network, in which case there would be no need for a first signal component.

A tenant connected to a local communication circuit 3, 3', 3" for direct communication can also be included as a party for access via the public subscriber telephone network, whereby there are two alternative routes for establishing contact. This can be desirable for a firm or an office, particularly if a visitor should arrive after office hours, and the dedicated reply set 4, 4', 4" is located in an unoccupied room. For this particular example, the local direct communication circuit 3, 3', 3" can be programmed as selected route during office hours, whereas the route via the public subscriber telephone network is selected outside office hours. Obviously, both routes may also be available simultaneously, if desired.

It should be noted, that all modern entrance telephone systems are based on the use of a microprocessor, which has an operating capacity exceeding the requirements of existing functions, and which can be addressed with code or telephone numbers from a keypad. Specific codes from the keypad will instruct the microprocessor to establish connection via a corresponding direct local communication circuit, or via the aforementioned direct connection switch 2. Such a direct connection switch 2 is preferably included for each entrance set, or each remote "satellite" entry panel in systems with "multiple entry feature", i.e. one central master processor controls a number of separately located entrance sets.

Existing communication and command receipt functions (e.g. entrance door lock opening) can be used in known fashion. As a result, the only additional costs will relate to the wiring of each local communication circuit and the associated reply set, and a tenant will be able to make a decision on basis of the advantages obtained by a local direct communication circuit in relation to the above mentioned costs.

The inclusion of local communication circuits 3, 3', 3" add a further advantage, previously unobtainable with desired security. It is often desirable to reprogram the entrance telephone system 1, and it would be advantageous if such an operation could be performed without gaining physical access to the system. However, even though a system connected to a public subscriber telephone network can be contacted from a subscriber telephone set, such a method lacks required security, since an unauthorized person obviously may obtain information of the telephone number and any security codes required to gain access to the reprogramming function. This problem is overcome by giving one or a number of the dedicated reply sets 4, 4', 4" a higher priority status, facilitating establishment of contact from the reply set 4, 4', 4" with the system, and also accepting signals sent from such a reply set 4, 4', 4" as programming instructions.

Furthermore, alarm transmission from directly connected reply sets 4, 4', 4" can also be permitted as an additional feature. Such reply sets 4, 4', 4" may be authorized to initiate the line connect and dialling capacity of the system, and thus permit outgoing calls via the public subscriber telephone network. In order to overcome the problem of entrance calls via the public subscriber telephone network preventing alarm calls with high priority, the latter can be given a higher degree of priority, i.e. entrance calls are prevented or terminated when an alarm call is initiated. The system may also obviously be arranged having more than one telephone line connected to the public subscriber telephone network, utilizing the second line when the first is engaged. Such an arrangement would also facilitate simultaneous communication via the public subscriber telephone network of more than one entrance call.

The local communication circuits 3, 3', 3" may also be arranged to permit video signal transmission, i.e. of wide band type, if desired. This would make it possible to establish video and audio communication, a feature which is difficult/impossible to obtain via conventional telephone line circuits.

All the above disclosed features are obtainable due to the fact that a microprocessor is used to control the system. In the systems used today, not only line connection and dialling of selected tenants is controlled by the microprocessor, but also additional features based on information transmitted from the telephone of a called party as digits (pulsed signals or MFC-signals). The existing systems thus already include a suitable control means, having a capacity facilitating control also of local communication circuits 3, 3', 3". Existing systems would only require modifications and reprogramming, in order to facilitate connection of local communication circuits 3, 3', 3", and to operate same in the fashion described.

In the preferred embodiment shown and described with reference to FIG. 1, the local communication circuits 3, 3', 3" have been shown as individual and parallel circuits, each one connected to a dedicated reply set 4, 4', 4". However, several reply sets 4, 4', 4" may also be connected in series to one terminated circuit only (FIG. 2), or to a loop. This arrangement requires transmission using pulse code techniques, in order to select the correct reply set 4, 4', 4" for an entrance call, and the local direct switch 2 is thus replaced by a pulse code transmitter/decoder 6. In this situation, it is also very cumbersome to achieve call secrecy, i.e. that a connected reply set in the loop can not overhear ongoing conversation with another reply set simply by lifting the receiver and listen in, here due to the fact that the selecting can easier be pulse coded than the following audio conversation on the line. Alternatively, each reply, set 4, 4', 4" may include a receiver circuit for a frequency particular to each reply set 4, 4', 4", which is actuated by a signal sent on the communication circuit as an initial signal with corresponding frequency, thereby activating correct reply set 4, 4', 4".

Even though the description has referred to an entrance telephone system, it is obviously also possible to use same for other purposes, e.g. for access control to safe deposit boxes, car parks or other purposes.

What is claimed is:

1. An entrance communication system comprising: a programmable number discriminator, arranged to perform an automatic dial-up operation via a public subscriber telephone network to a selected subscriber telephone set when addressed from at least one entrance set, and to establish voice communication therebetween and accepting control instructions sent as digits from the called party at the entrance set, wherein at least one local communication circuit is included for direct communication between the entrance set and at least one dedicated reply set which is not connected to the public subscriber telephone number, and wherein each dedicated reply set is connected by means of individual and parallel local communication circuits.

2. An entrance communication system as claimed in claim 1, wherein at least one dedicated reply set is arranged to be connected to the public subscriber telephone network to perform dial-up from the dedicated reply set for establishment of alarm calls or other telephone calls via the public subscriber telephone network.

3. An entrance communication system as claimed in claim 1, wherein at least one dedicated reply set is arranged to be connected to gain access to the programmable number discriminator for modifying the programming function of the system, and to facilitate reprogramming of the system by pulse code or MFC-signals entered as dialled information from the reply set.

4. An entrance communication system as claimed in claim 1, wherein the number discriminator comprises first and second output terminals and is arranged to switch a call to a dedicated reply set via said first output terminal to said public telephone network and to one of said reply sets via said second output terminal connected to a selected local communication circuit.

5. An entrance communication system as claimed in claim 1, wherein the local communication circuit is of wide band type, facilitating video and voice communication.

6. An entrance communication system comprising: a programmable number discriminator, arranged to perform an automatic dial-up operation via a public subscriber telephone network to a selected subscriber telephone set when addressed from at least one entrance set, and to establish voice communication therebetween and accepting control instructions sent as digits from the called party at the entrance set, wherein at least one local communication circuit is included for direct communication between the entrance set and at least one dedicated reply set which is not connected to the public subscriber telephone number, and wherein the local communication circuit comprises a circuit facilitating connection in series of a number of individually connectable reply sets.

7. An entrance communication system as claimed in claim 6, wherein transmission on the local communication circuit involves use of pulse code techniques.

8. An entrance communication system comprising: a programmable number discriminator, arranged to perform an automatic dial-up operation via a public subscriber telephone network to a selected subscriber telephone set when addressed from at least one entrance set, and to establish voice communication therebetween and accepting control instructions sent as digits from the called party at the entrance set, wherein at least one local communication circuit is included for direct communication between the entrance set and at least one dedicated reply set which is not connected to the public subscriber telephone number, and a direct connection switch, and wherein the number discriminator is arranged to connect a call to a dedicated reply set via said direct connection switch, said direct connection switch being associated with the entrance set.

9. An entrance communication system comprising: a programmable number discriminator, arranged to perform an automatic dial-up operation via a public subscriber telephone network to a selected subscriber telephone set when addressed from at least one entrance set, and to establish voice communication therebetween and accepting control instructions sent as digits from the called party at the entrance set, wherein at least one local communication circuit is included for direct communication between the entrance set and at least one dedicated reply set which is not connected to the public subscriber telephone number, and wherein a separate addressable control panel is provided for each entrance set for establishment of calls to reply sets connected by means of local communication circuits.

10. An entrance communication system for establishing communication between a person at an entrance set and a person at a subscriber location, the system comprising:
a plurality of subscriber telephone sets each located at a subscriber location and connected to a public telephone network;
a plurality of directly connected reply sets each located at a subscriber location;
at least one entrance set having dialing means for dialing digits corresponding to a code for specifying a particular one of said subscriber telephone sets or a particular one of said directly connected reply sets at a subscriber location to which a person desires access;
network switching means including programmable number discriminating means, said programmable number discriminating means being connected to said public telephone network and to said entrance set for performing a dialing operation over said public telephone network according to said digits dialed at said entrance set to address a subscriber telephone set or a directly connected reply set at a particular subscriber location for providing communication between a person at said entrance set with a person at said particular subscriber location by way of the public telephone network via a corresponding subscriber telephone set at said particular subscriber location or to a directly connected reply set at said particular subscriber location;
direct connection switch means connected to said programmable number discriminating means and to each of said directly connected reply sets for connecting said entrance set to the directly connected reply set corresponding to said particular subscriber location depending upon the digits dialed at said entrance set; and a plurality of local communication circuits for connecting in parallel each of said directly connected reply sets to said direct connection switch means.

11. The system of claim 10, and further comprising a entrance door lock means for controlling entrance to a building by a person at said entrance set, and wherein each directly connected reply set comprises a telephone set and said network switching means further comprises a lock release impulse generator connected to said entrance door lock means responsive to a code signal generated at the subscriber set at said particular subscriber station or said directly connected set at said particular subscriber station for unlocking said entrance door lock means to permit entrance by a person at said entrance set.

12. The system of claim 10, wherein each directly connected reply set is capable of accessing said network switch to place calls through the public telephone network for making alarm calls or other telephone calls.

13. The system of claim 10, wherein each directly connected reply set is capable of programming said programmable number discriminating means.

14. The system of claim 10, and further comprising an addressable control panel at said entrance set for establishing communication exclusively to one of said directly connected reply sets.

15. The system of claim 14, wherein said addressable control panel comprises a plurality of keys each corresponding to one of said directly connected reply sets.

16. The system of claim 15, wherein said addressable control panel generates a code sequence upon activating one of said keys, said code sequence comprising a first component identifying the call as a directly routed call and a second component identifying the directly connected reply set corresponding to the key.

17. An entrance communication system for establishing communication between a person at an entrance set and a person at a subscriber location, the system comprising:

a plurality of subscriber telephone sets each located at a subscriber location and connected to a public telephone network;

a plurality of directly connected reply sets each located at a subscriber location;

at least one entrance set having dialing means for dialing digits corresponding to a code for specifying a particular one of said subscriber telephone sets or a particular one of said directly connected reply sets at a subscriber location to which a person desires access;

network switching means including programmable number discriminating means, said programmable number discriminating means being connected to said public telephone network and to said entrance set for performing a dialing operation over said public telephone network according to said digits dialed at said entrance set to address a subscriber telephone set or a directly connected reply set at a particular subscriber location for providing communication between a person a said entrance set with a person at said particular subscriber location by way of the public telephone network via a corresponding subscriber telephone set at said particular subscriber location or to a directly connected reply set at said particular subscriber location;

direct connection switch means connected to said programmable number discriminating means and to each of said directly connected reply sets for connecting said entrance set to the directly connected reply set corresponding to said particular subscriber location depending upon the digits dialed at said entrance set; and a plurality of local communication circuits for connecting each of said directly connected reply sets in series to said direct connection switch means.

* * * * *